Figure 1:
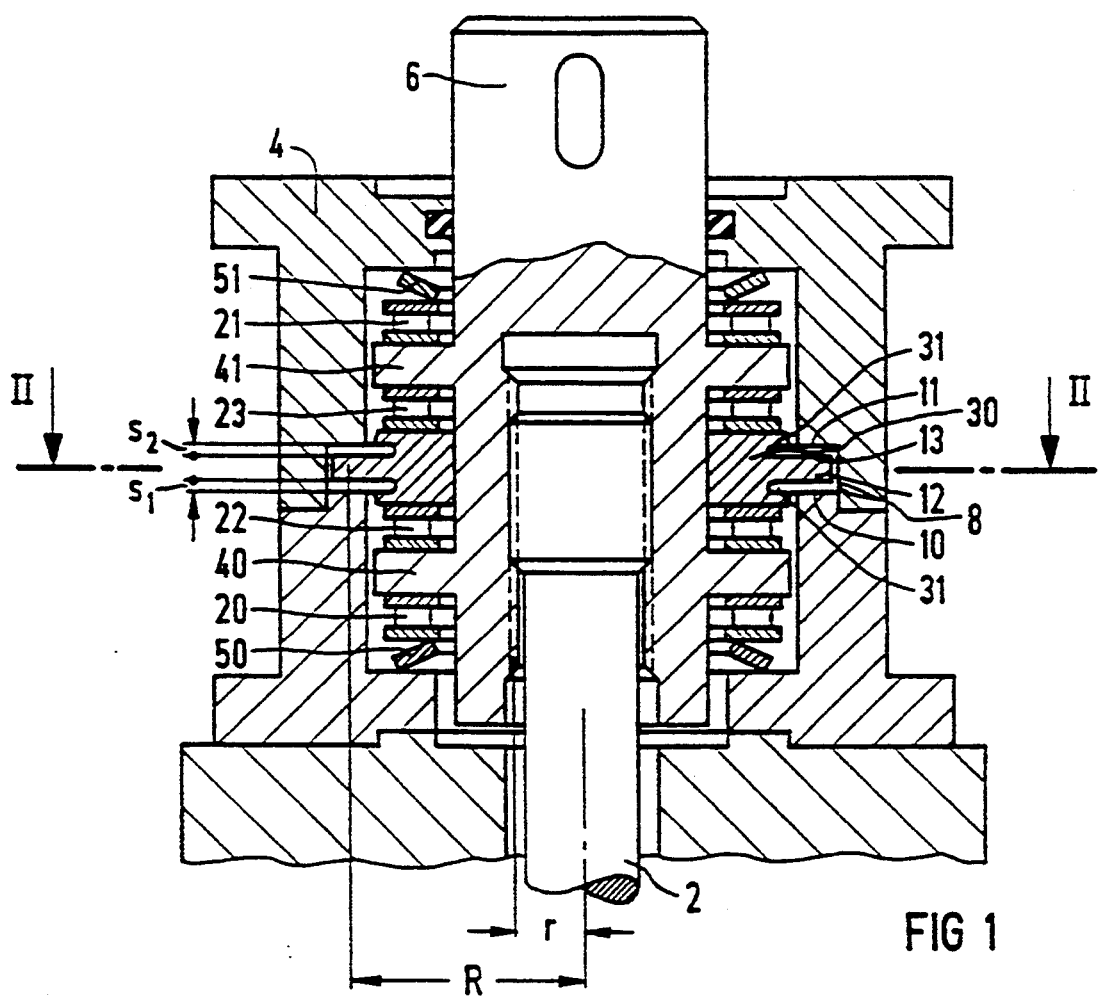

United States Patent [19]

Schabert et al.

[11] Patent Number: 5,377,952
[45] Date of Patent: Jan. 3, 1995

[54] SHUT-OFF VALVE

[75] Inventors: Hans-Peter Schabert, Erlangen; Erwin Laurer, Möhrendorf, both of Germany

[73] Assignee: Siemens Aktiengesellschaft, Munich, Germany

[21] Appl. No.: 967,405

[22] Filed: Oct. 26, 1992

[30] Foreign Application Priority Data

Apr. 25, 1990 [DE] Germany ............................ 4013176

[51] Int. Cl.$^6$ ...................... F16K 31/04; F16K 31/50
[52] U.S. Cl. ...................... 251/129.13; 74/89.15; 251/268; 318/469
[58] Field of Search ............ 74/424.8 VA, 785, 840, 74/841, 89.15; 251/64, 129.11, 129.12, 129.13, 267, 268, 269, 273, 278; 310/77, 92, 93; 318/468, 469

[56] References Cited

U.S. PATENT DOCUMENTS

| | | | |
|---|---|---|---|
| 2,992,807 | 7/1961 | Karlby et al. | 251/76 |
| 3,327,826 | 6/1967 | Fleuschke | 192/141 |
| 3,616,884 | 11/1971 | Balz | 251/129.12 |
| 3,700,085 | 10/1972 | Balz | 251/129.12 |
| 3,994,178 | 11/1976 | Feare | 74/89.15 |
| 4,021,015 | 5/1977 | Maeder et al. | 310/162 |
| 4,546,281 | 10/1985 | Gladisch et al. | 251/129.12 |
| 4,770,390 | 9/1988 | Tratz et al. | 251/129.11 |
| 4,994,721 | 2/1991 | Plotnikov et al. | 251/129.12 |

FOREIGN PATENT DOCUMENTS

| | | |
|---|---|---|
| 0193776 | 9/1986 | European Pat. Off. . |
| 2134221 | 8/1984 | Germany ............... 251/129.11 |
| 2437778 | 8/1984 | Germany . |
| 3314781 | 10/1984 | Germany . |

*Primary Examiner*—George L. Walton
*Attorney, Agent, or Firm*—Herbert L. Lerner; Laurence A. Greenberg

[57] ABSTRACT

A valve, particularly for shutting off a flow, includes a housing. A rotationally fixed threaded part is rotationally fixed and axially displaceable in the housing. A rotatable threaded part is axially resiliently and rotatably supported in the housing. A brake device has at least two friction surfaces facing one another. One of the friction surfaces is rotationally fixed in the housing, and the other of the friction surfaces is rotationally fixedly joined to the rotatable threaded part. The friction surfaces are pressed against one another by an axial displacement for braking a rotary motion of the rotatable threaded part and forming a braking surface, if a predetermined command force upon the rotationally fixed threaded part is exceeded. At least one of the friction surfaces has a predetermined free angle for rotational fixation. According to one embodiment of the invention, at least one brake ring is axially displaceably disposed on the rotatable threaded part, and the other of the friction surfaces is located on the at least one brake ring. According to another embodiment of the invention, a brake sleeve being axially displaceable in the housing has an end surface, and the one friction surface is disposed on the end surface of the brake sleeve.

40 Claims, 3 Drawing Sheets

SHUT-OFF VALVE

CROSS-REFERENCE TO RELATED APPLICATION

This application is a continuation of International Application Serial No. PCT/DE91/00200, filed Mar. 6, 1991.

SPECIFICATION

The invention relates to a valve, particularly for shutting off a flow, including a threaded part being rotationally fixed and axially displaceable in a housing; a threaded part being axially resiliently and rotatably supported in the housing; and a brake device having at least two friction surfaces facing one another, the at least two friction surfaces being pressed against one another by an axial displacement in order to brake the rotary motion of the rotatable threaded part and to form a braking surface, if a predetermined command force upon the rotationally fixed threaded part is exceeded, one of the friction surfaces facing one another being disposed in a rotationally fixed manner in the housing, and the other being joined in a rotationally fixed manner to the rotatable threaded part.

Shut-off valves often have an axially displaceable spindle which is provided with a closure element, such as a valve cone or a valve plate, and is moved by a spindle nut that is rotatably supported in a housing. As the closure element moves into its seat, a predetermined torque is necessary. The torque depends on the designated pressure in the flow to be shut off, on the spindle geometry, and on the coefficient of friction in the thread of the spindle nut. In the case, of a high-pressure valve with a rated width of 25 mm, for instance, a command torque value (minimum value) of approximately 30 Nm is typical. However, corrosion can considerably increase the coefficients of friction in the thread of the spindle nut after a relatively long time in service. Higher torques, such as approximately 80 Nm, are then correspondingly necessary to loosen the spindle nut.

An actuator for the valve must then be constructed in such a way that it can bring such a high loosening moment to bear even under unfavorable operating conditions. With an electric motor actuator, it may, for instance, be a low voltage resulting from fluctuations in the mains voltage. However, at high mains voltage, with a cold winding in the electric motor, a positive motor production tolerance and high valve rigidity, the actuator may develop a much higher torque, unless it is turned off as a function of torque. If the interaction among all of the tolerances is unfavorable, the torque can rise to 300 Nm, for instance. If the torque-dependent turn-off fails, then in the unfavorable case a torque that is ten times the command torque can occur. In that case, the spindle is severely overloaded and may possibly buckle.

Published European Application No. 0 193 776 A1, corresponding to U.S. Pat. No. 4,770,390, discloses a valve in which the torque made available by the actuator for generating the spindle force is already reduced during the adjusting motion To that end, a brake bushing is provided that is supported by slide surfaces on its end surface on a brake housing and is rotated jointly with the spindle nut after a free rotary angle of approximately 330°. When the spindle nut is rotated back again, the braking then does not take place over the free angle range, so that the torque produced by the actuator is fully available to loosen the spindle braced in the nut thread. The braking moment produced in the brake is already operative before the terminal position is reached and is proportional to the spindle force and to the coefficient of friction of the sliding surfaces. This brake may, for instance, be constructed in such a way that as it moves into the terminal position, it consumes approximately 75% of the drive torque. In accordance with the aforementioned numerical example, that means that the drive must be constructed not for a minimum torque of 30 Nm but rather of 120 Nm. That makes it too complicated and expensive, and too heavy, in many cases. Moreover, the torques that then arise in shut-off failures under unfavorable conditions are likewise correspondingly higher.

Figure 4:
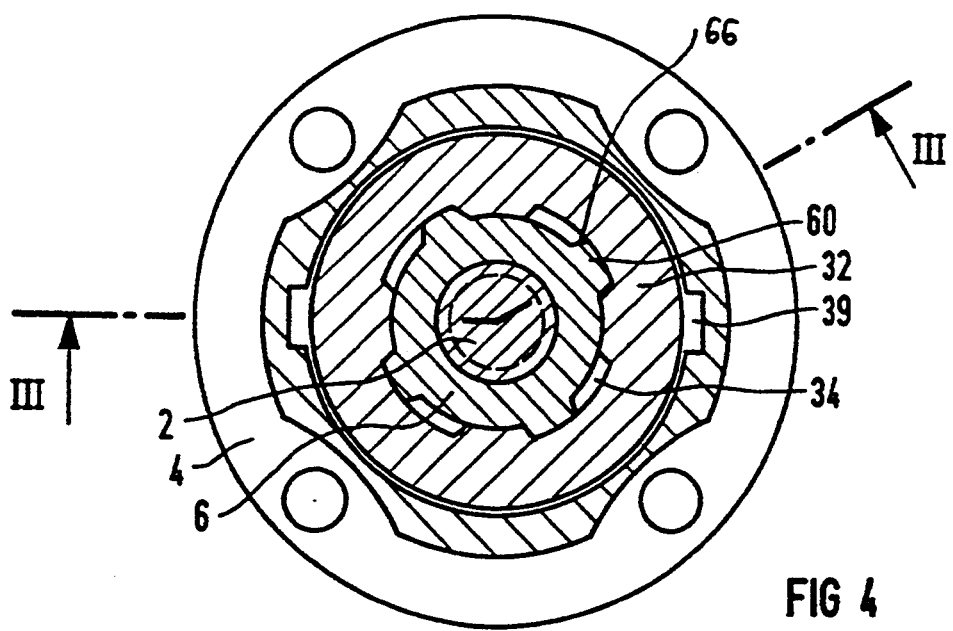

FIG. 4 of German Published, Non-Prosecuted Application 33 14 781 A1, corresponding to U.S. Pat. No. 4,546,281, discloses a valve in which the spindle nut is additionally braked only after a predetermined spindle force is exceeded. It is attained by axially resiliently supporting the spindle nut in the valve housing and providing it with a stop ring, which is pressed against a brake bushing that includes annular springs and is supported in the housing, if a predetermined spindle force is exceeded. A braking action is generated as a result of the braking moment generated between the stop ring and the brake bushings, so that only some of the torque furnished by the drive is exerted upon the spindle. An overload on the spindle can be prevented effectively in the event of so-called shut-off failure by means of such provisions.

However, in that known valve, the additional braking moment must be brought to bear as well in the ensuing loosening of the spindle nut. Since the coefficients of friction of the braking surfaces of the spindle nut brake can also increase after a relatively long time in service, the torques necessary to loosen the spindle nut can be even higher than the torques arising in the event of shut-off failure. Under such circumstances, it is virtually impossible to loosen the threaded nut.

It is accordingly an object of the invention to provide a shut-valve, which overcomes the hereinafore-mentioned disadvantages of the heretofore-known devices of this general type, which has a braking device for controlling shut-off failure, and in which the spindle nut can still be loosened easily even if the braking device has become operative.

With the foregoing and other objects in view there is provided, in accordance with the invention, a valve, particularly for shutting off a flow, comprising a housing; a rotationally fixed threaded part being rotationally fixed and axially displaceable in the housing; a rotatable threaded part being axially resiliently and rotatably supported in the housing; a brake device having at least two friction surfaces facing one another, one of the friction surfaces being rotationally fixed in the housing, and the other of the friction surfaces being rotationally fixedly joined to the rotatable threaded part; the friction surfaces being pressed against one another by an axial displacement for braking a rotary motion of the rotatable threaded part and forming a braking surface, if a predetermined command force upon the rotationally fixed threaded part is exceeded; at least one of the friction surfaces having a predetermined free angle for rotational fixation; and either at least one brake ring is axially displaceably disposed on the rotatable threaded part, and the other of the friction surfaces is located on the at least one brake ring; or a brake sleeve being axially displaceable in the housing has an end surface, and the one friction surface is disposed on the end surface of the brake sleeve.

If the braking device has become operative, at least two friction surfaces are pressed against one another and form a braking surface. One friction surface is joined to the housing in such a manner as to be fixed against relative rotation, and the other friction surface is joined to the rotatably supported threaded part in such a manner as to be fixed against relative rotation. Since a predetermined free angle is provided for the rotational fixation of at least one of the two friction surfaces, this friction surface is not moved jointly during the rotary motion within the free angle in the course of loosening the rotatable threaded part. In order to loosen the rotatable threaded part, the braking moment effective in the friction surfaces need not be brought to bear. As a result and instead, only the torque for loosening the thread and for the usual low-friction axial bearing of the rotatably supported threaded part is needed. During the rotary motion of the rotatable threaded part in the free angle range, the two friction surfaces are relieved, and the braking action between the two friction surfaces is cancelled entirely or in part.

In accordance with still another feature of the invention, the free angle is provided both for the friction surface that is joined to the housing in such a manner as to be fixed against relative rotation and for the friction surface that is joined to the rotatable threaded part in such a manner as to be fixed against relative rotation.

In accordance with still a further feature of the invention, the free angle corresponds to a stroke of the spindle nut of approximately 0.3 mm, and at least approximately 0.01 mm.

In accordance with another feature of the invention, while movement occurs through the free angle, a low-friction bearing, in particular a roller bearing, is provided for the transmission of the resultant braking force.

In accordance with a further feature of the invention, in order to increase the braking action, a plurality of friction surfaces facing toward one another are provided in such a way that they are displaceable relative to one another and if the command force is exceeded, a plurality of braking surfaces are formed. Each of the frictional surfaces facing one another is preferably formed of a different material. For instance, one friction surface may be of brass or bronze and the other of steel.

In accordance with an added feature of the invention, the friction surfaces being joined to the rotatable threaded part in such a manner as to be fixed against relative rotation are located on at least one brake ring disposed axially displaceably on this threaded part.

In accordance with an additional feature of the invention, the inner surface of the at least one brake ring has one and preferably at least three recesses formed therein for a driving or coupler tooth connected to the rotatable threaded part in a torque-locking manner.

In accordance with yet another feature of the invention, the at least one ring at the recesses and the driving tooth assigned to each of them are provided with inclined lateral surfaces.

This produces self-centering of the brake ring so that, in accordance with yet a further feature of the invention, it equipped with an adequate radial play, preferably of more than 0.02 mm, with respect to the rotatably supported part. As a result, the brake ring and the rotatably supported threaded part do not touch each other as the free angle is run through.

In accordance with yet an added feature of the invention, the friction surfaces are conical. This increases the effective braking moment.

In accordance with yet an additional feature of the invention, the frictional surfaces have a friction lining that is highly effective even in the presence of lubricant.

In accordance with again another feature of the invention, the friction surfaces have radial grooves that positively displace lubricant. These provisions produce a braking action that is only slightly dependent on the lubricant state of the friction surfaces.

In accordance with again a further feature of the invention, particularly good braking action is attained if the mean distance between the friction surfaces and the center axis of the axially displaceable threaded part is at least twice the lateral surface radius of the thread.

In accordance with again an added feature of the invention, there is provided a plurality of spring groups producing higher spring rigidity results for the resilient support of the rotatable threaded part in the housing if a predetermined command force is exceeded, than if this command force fails to be attained.

In accordance with again an additional feature of the invention, the spring groups include a first spring group for the command force and a second spring group for the additional braking force arising if this command force is exceeded, or for the total force.

In accordance with still another feature of the invention, only structurally identical cup springs are used for all of the spring groups. The differing spring rigidity can then be attained by means of an appropriate layering.

In accordance with still a further feature of the invention, the second spring group is a brake ring constructed as a spring element.

In accordance with a concomitant feature of the invention, the axially displaceable threaded part is a spindle or nut, being fixed in the housing against relative rotation.

Reliable control of shut-off failure is attained in particular if the valve according to the invention is provided with an actuator in which mechanical or electrical means, such as those disclosed in Published European Application No. 0 193 776 A1, corresponding to U.S. Pat. No. 4,770,390, for example, are used to attain a higher torque upon moving out of the end position than upon moving into the end position.

Other features which are considered as characteristic for the invention are set forth in the appended claims.

Although the invention is illustrated and described herein as embodied in a shut-off valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
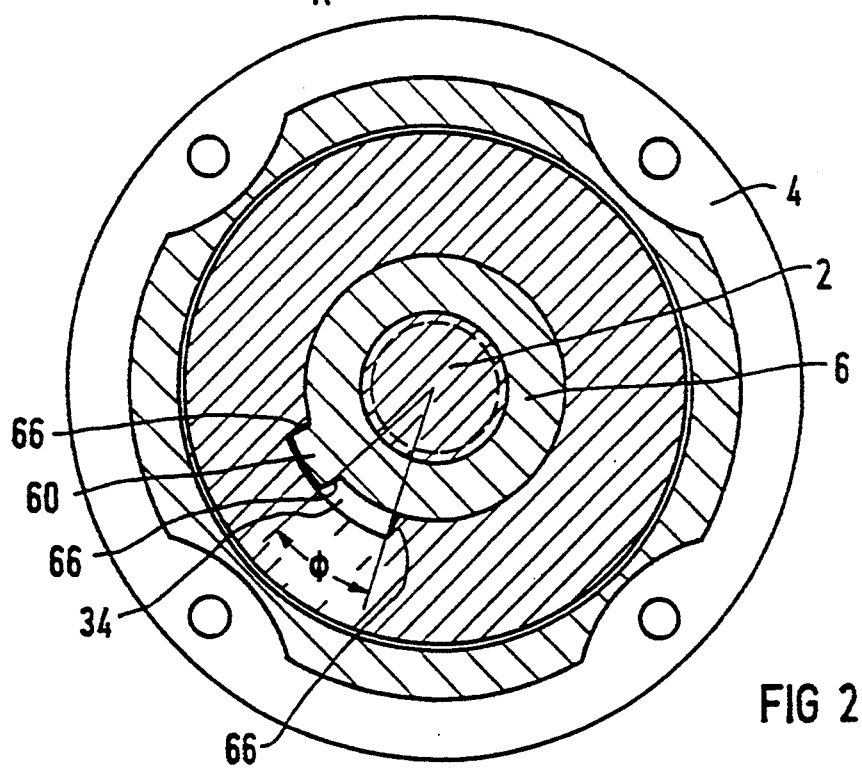
Figure 3:
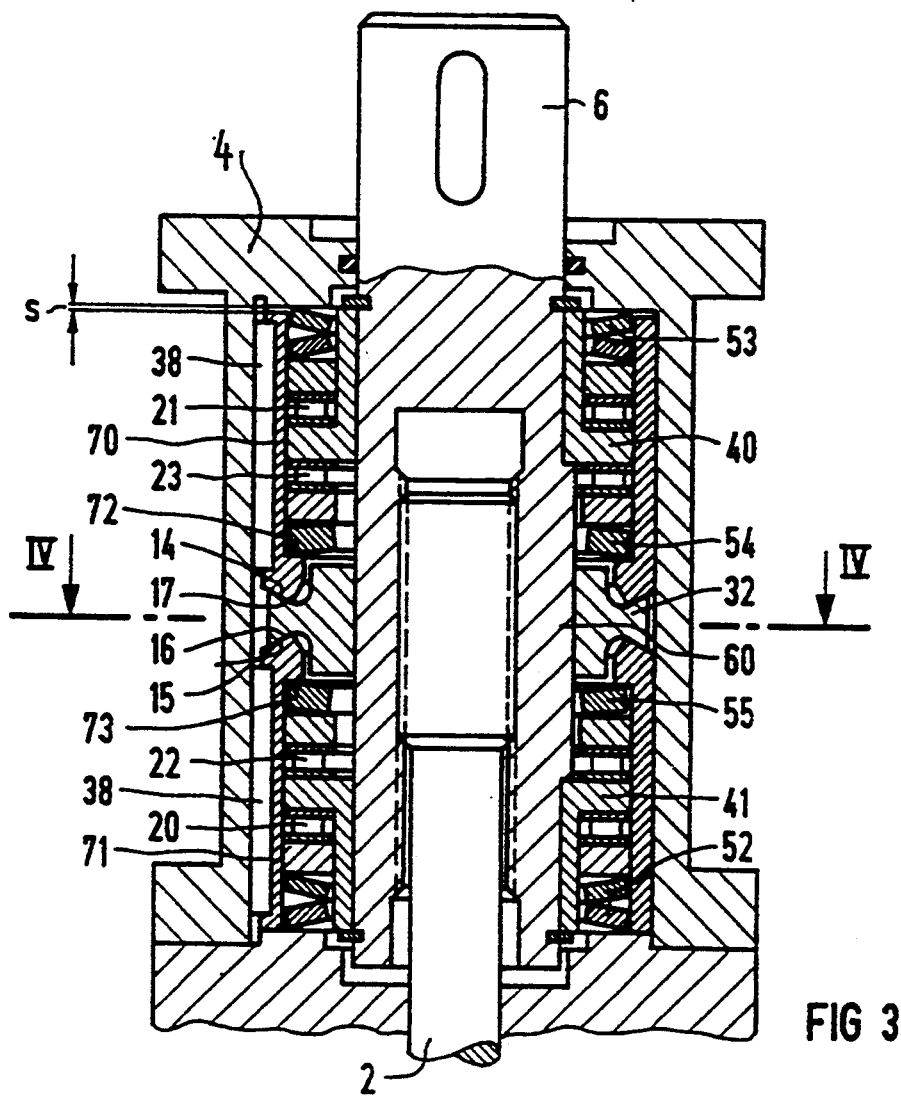
Figure 5:
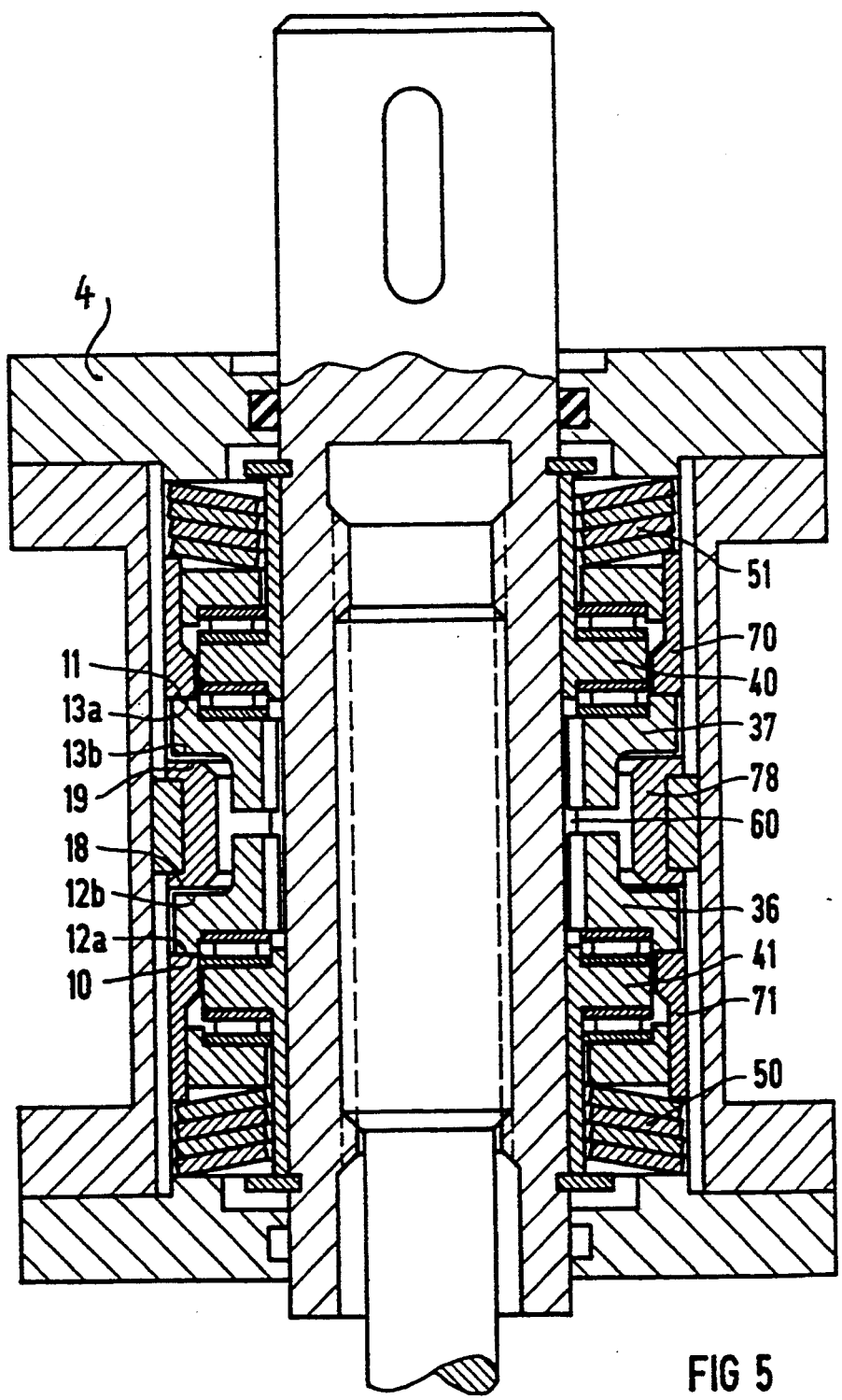

FIG. 1 is a fragmentary, diagrammatic, partly broken-away, longitudinal-sectional view and FIG. 2 is a cross-sectional view taken along the line II—II of FIG. 1, in the direction of the arrows, showing a valve according to the invention;

FIGS. 3 and 4 are views similar to FIGS. 1 and 2, wherein FIG. 3 is taken along the line III—III of FIG. 4, in the direction of the arrows and FIG. 4 is taken along the line IV—IV of FIG. 3, in the direction of the arrows, showing a further advantageous exemplary embodiment of a valve with two effective brake surfaces; and FIG. 5 is another fragmentary, partly broken-away, longitudinal-sectional view of a particularly preferred embodiment of a valve according to the invention, with three effective brake surfaces.

Referring now to the figures of the drawing in detail and first, particularly, to FIG. 1 thereof, there is seen a valve, in the form of a rotationally fixed threaded part, which includes a spindle 2 with a non-illustrated closure element, that is movable axially by a spindle nut 6 which is supported rotatably in a housing 4. The spindle nut 6 is provided with two driving flanges 40 and 41, each being supported by a respective roller bearing 20 and 21 and spring groups 50 and 51 in the housing 4. The closure element has two end positions, which it respectively reaches at a valve seat and at a back seat.

A brake ring 30 is joined to the spindle nut 6 in a rotationally fixed manner and is supported rotatably on roller bearings 22 and 23 with a predetermined play relative to the spindle nut 6. In an outer peripheral region thereof, the brake ring 30 runs in an annular groove 8 in the housing 4. End surfaces in the peripheral region of the brake ring 30 and lateral surfaces of the housing 4 at the annular groove 8 are constructed as respective annular friction surfaces 12, 13 and 10, 11. The friction surfaces 10–13 are preferably provided with a friction lining that positively displaces lubricant or with radial grooves that positively displace lubricant, so that a coherent film of lubricant cannot form. The friction linings of the friction surfaces 12, 13 and 10, 11 respectively located on the brake ring 30 and on the housing 4, are preferably made of different materials, such as brass and steel. A respective play $s_1$ and $s_2$ is established between the friction surfaces 12 and 13 of the brake ring 30 and the friction surfaces 10 and 11 of the housing 4 at the annular groove 8. This play is approximately equal in a force-free position of repose of the spindle 2. When the spindle nut 6 and the axially displaced spindle 2 are rotating, the plays $s_1$ and $s_2$ are established, which depend on the spring rigidity of the spring groups 50 and 51 and on the brake moments caused by friction in the nut thread.

In FIG. 2, it is seen that the spindle nut 6 is provided with a driving tooth 60 that engages a recess 34 in the brake ring 30. After sweeping over a free angle $\phi$, lateral surfaces 66 of the driving tooth 60 and the brake ring 30 at the recess 34 touch, resulting in a torque-locking connection between the spindle nut 6 and the brake ring 30. This free angle $\phi$ is at least large enough to ensure that the spindle stroke belonging to it is at least 0.01 mm long. Preferably, however, a free angle $\phi$ is provided that effects a spindle stroke of approximately 0.1 mm to 0.5 mm, for instance. In the case of a 24×3 nut thread (trapezoid thread), this corresponds to a free angle $\phi$ of between 12° and 60°.

At the end of the travel of the spindle 2, once the closure element has reached the valve seat, the force exerted upon the spindle 2 rises steeply, and the spindle nut 6 begins to climb, counter to the spring action of a spring group, for example that of the spring group 51, as the spindle 2 is moving downward, and the driving flange 40 moves the brake ring 30 upward. The play $s_2$ between the upper friction surface 13 of the brake ring 30 and the friction surface 11 of the housing 4 at the annular groove 8 becomes less, and at a predetermined command force on the spindle 2, for instance of approximately 15 kN, which results substantially from the spring travel and from the spring rigidities of the spring groups 50 and 51, this play vanishes.

During the reciprocating motion of the spindle nut 6, the free angle $\phi$ of the rotary play of the brake ring 30 is brought to bear, and the brake ring 30 is rotated with and by the spindle nut 6, as is seen in FIG. 2. The friction surfaces 11 and 13 are pressed together by an additional braking force and form a braking surface. The result is an additional braking moment that depends on a mean spacing R of the friction surfaces from the spindle axis, the spindle force, and the coefficient of friction of the brake surface formed by the friction surfaces 12 and 13. Since the spacing R is greater than a lateral surface radius r of the nut thread, the result is effective limiting of the axial force exerted on the spindle 2 by the drive mechanism. The spacing R preferably amounts to at least twice and in particular three times the lateral surface radius r. Due to this provision, buckling of the spindle 2 upon shut-off failure of the drive mechanism is avoided.

In order to release the spindle 2 from the end position, the rotary motion of the spindle nut 6 is reversed. Due to the available free angle $\phi$ of the rotational fixation between the spindle nut 6 and the spindle 2, the torque-locking connection between the spindle nut 6 and the brake ring 30 is released and the entire drive moment is available for loosening the spindle 2 braced in the nut thread. At the same time, the brake surface formed by the friction surfaces 11 and 13 is relieved by an axial motion of the spindle nut 6. Once the friction surface 13 is jointly rotated, after passage through the free angle $\phi$, the braking action is cancelled entirely or predominantly, so that the torque available from the actuator is easily sufficient for further rotation.

According to a further embodiment, the brake ring 30 may also be resiliently supported between the coupler flanges 40 and 41. This can be effected either by means of two further spring groups that are located, for instance, between the coupler flanges 40, 41 and the roller bearings 22 and 23, for instance, or by a brake ring 30 that itself is constructed as a spring element. This is achieved in the example shown in the drawing by a brake ring 30 that is provided with two recesses 31. These recesses 31 lend the brake ring 30 a resilience in the manner of a cup spring. The spring groups and the brake ring 30 that is constructed as a spring element preferably have a higher spring rigidity than the spring groups 50 and 51 and become operative once the play $s_1$ or $s_2$ vanishes. The spindle nut 6 is then supported resiliently in the housing 4, although with substantially increased spring rigidity, even after the play $s_1$ or $s_2$ has vanished.

Instead of an annular groove 8, annular springs may also be provided in the housing 4, analogously to that of FIG. 4 of German Published, Non-Prosecuted Application 33 14 781 A1, corresponding to U.S. Pat. No. 4,546,281, with the brake ring 30 being pressed against their end surfaces if the command force is exceeded.

A corresponding feature, in which the spindle nut is resiliently supported even after the play s has vanished, is achieved in the advantageous embodiment of the invention shown in FIG. 3. In the housing 4, two axially displaceable brake sleeves 70 and 71 are secured against torsion by adjusting springs 38. The spindle nut 6 is resiliently supported in the housing by spring groups 52 and 53, each of which are made up of two cup springs that are connected in series, as in the example shown in the drawing. The brake sleeves 70 and 71 are provided with respective shoulders 72 and 73, which are each connected in a force-locking manner with the driving flanges 40 and 41 of the spindle nut 6, through respective further spring groups 54 and 55 and roller bearings 23 and 22. The spring groups 54 and 55 preferably have a higher spring constant than the spring groups 52 and 53. In the example shown in the drawing, each of the spring groups 54 and 55 include a single cup spring. Preferably, however, the spring groups 54 and 55 are each made up of a plurality of parallel-layered cup springs, which are structurally identical to the cup springs of the spring groups 52 and 53.

The spring groups 53, which are used for the command force and the spring groups 54, which are used for the additional braking force, and are shown in FIG. 3, act in parallel when the play s is brought to bear. If the two forces attain a value of 15 kN, for instance, then a total force of 30 kN acts upon the spindle. It is also possible, by means of a non-illustrated modified spring configuration, to connect the spring groups one after another in such a way that the stiffer spring group 54 takes on the total force, while the softer spring group 53 is not exposed to any further increase in its load once its command force of 15 kN has been attained and the play s has been reached.

A criterion for an appropriate maximum value of the free angle $\phi$ can be derived from the rigidity of the spring groups 54 and 55. If it is in fact assumed for an unfavorable operating situation, that a brake ring 32 does begin to traverse its free angle $\phi$ relative to the threaded nut 6 until the braking action should actually already be effective as specified, once the command force is attained, then the braking action begins with a delay by the free angle $\phi$ and ensues abruptly upon a value of the additional axial brake force that has already sharply risen because of the action of the spring group 54 or 55. However, this additional brake force must not overload the spindle 2. The appropriate maximum value of the free angle accordingly depends on the axial travel of the spring group 54 or 55 until a still-allowable axial additional brake force has built up. Twice the command force can be given as a reference value for this, or in this particular numerical example, $2 \times 15$ kN=30 kN. This would then lead to a total spindle force of approximately 30 kN+15 kN=45 kN.

End surfaces of the brake sleeves 70 and 71 that face one another, are provided with respective conically shaped friction surfaces 14 and 15, which can be pressed against likewise conical friction surfaces 17 and 16 of the brake ring 32 that is joined to the spindle nut 6 in a rotationally fixed manner, with a predetermined free angle. The brake ring 32 is axially displaceably disposed on the spindle nut 6. The climbing of the spindle nut 6 while the spindle 2 is deadlocked, relieves the spring group 52 and by means of the driving flange, the brake sleeve 71 is put in contact with the brake ring 32, which is then displaced axially upward and carries the brake sleeve 70 along with it, until the play or gap s between the brake sleeve 70 and the housing 4 disappears. The friction surfaces 14 and 17, on one hand, and the friction surfaces 15 and 16, on the other hand, are pressed against one another and form two brake surfaces that are cushioned by the cup springs 54 and 55. By using two brake surfaces, the effective braking moment is increased as compared with the embodiment of FIG. 1. A further increase in the braking moment is also effected by the conical construction of the friction surfaces 14–17.

Upon loosening of the spindle nut, the brake surface is also relieved by the free angle $\phi$ between the brake ring 32 and the spindle nut 6. FIG. 4 shows a preferred feature of the rotational fixation between the spindle nut 6 and the brake sleeve 32, in which four driving teeth 60 and four recesses 34 are provided. Both the driving teeth 60 and the brake ring 32 at the recesses 34 are preferably provided with oblique lateral surfaces 66.

In the case of the brake sleeves as well, the free angle $\phi$ can be achieved by means of suitable recesses and shaped regions in the housing 4 and in the brake sleeves 70 and 71, respectively.

In the embodiment of FIG. 5, two axially displaceable brake rings 36 and 37 are provided, which are rotationally fixed to the spindle nut 6 and are each provided with two respective friction surfaces, 12a, 12b and 13a, 13b. An axially displaceable brake sleeve 78, which is joined to the housing in a rotationally fixed manner, is provided between the brake rings 36 and 37 on an inner wall surface of the housing 4.

The friction surfaces 10 and 11 of the further brake sleeves 71 and 70 are respectively associated with the respective friction surfaces 12a and 13a. As the spindle nut 6 climbs, the brake ring 36 is pressed by the driving flange 41 against the brake sleeve 78, which is displaced axially upward toward the brake ring 37 and presses the brake ring 37 against the brake sleeve 70, counter to the action of the spring group 51. In this construction, three jointly effective brake surfaces are created, and the braking moment that is available as the spindle 2 becomes deadlocked is increased even further. In this embodiment as well, either the brake rings 36 and 37 may be positionally fixed to the spindle nut 6 with a free angle $\phi$, or the brake sleeves 70, 71 and 78 can be joined to the housing 4 with a free angle $\phi$.

The drawings all show exemplary embodiments in which the spindle nut is rotatable in the housing and the spindle is rotationally fixed. However, the invention is also applicable to valves in which the spindle, arriving from above, can be rotated in a nut that is joined to the closure elements and rotationally fixed in the housing. In that case, the bearing body on the upper end of the spindle replaces the spindle nut described and shown in the drawings.

We claim:
1. A valve, comprising:
   a housing;
   a rotationally fixed threaded part being rotationally fixed and axially displaceable in said housing;
   a rotatable threaded part being axially resiliently and rotatably supported in said housing;
   a brake device having at least one brake ring being axially displaceably disposed on said rotatable threaded part, and at least two friction surfaces facing one another, one of said friction surfaces being rotationally fixed in said housing, and the other of said friction surfaces being rotationally fixedly joined to said rotatable threaded part and located on said at least one brake ring;
   said friction surfaces being pressed against one another by an axial displacement for braking a rotary motion of said rotatable threaded part and forming a braking surface, if a predetermined command force upon said rotationally fixed threaded part is exceeded; and at least one of said friction surfaces having a predetermined free angle defined by end positions for rotational fixations, whereby after the free angle has been traversed, the friction surfaces are lifted from one another so that no braking torque exists until another of the end positions has been reached.

2. The valve according to claim 1, including a low-friction bearing for transmitting force to said friction surfaces.

3. The valve according to claim 1, wherein said friction surfaces being rotationally fixedly joined to said rotatable threaded part have the free angle.

4. The valve according to claim 1, wherein the free angle corresponds to a stroke of said rotatable threaded part of at least 0.01 mm.

5. The valve according to claim 1, wherein a plurality of said friction surfaces are displaceable counter to one another for forming a plurality of brake surfaces when the command force is exceeded.

6. The valve according to claim 5, wherein said at least one brake ring has an inner surface with at least one recess formed therein, and said rotatable threaded part has a driving tooth disposed thereon for entering said at least one recess.

7. The valve according to claim 6, wherein said at least one recess is at least three recesses.

8. The valve according to claim 7, wherein said driving tooth and said at least one brake ring at said recesses have oblique lateral surfaces.

9. The valve according to claim 7, wherein said rotatable threaded part and said brake ring have a radial play of at least 0.02 mm therebetween.

10. The valve according to claim 1, wherein said friction surfaces are conical.

11. The valve according to claim 1, wherein said friction surfaces have a friction lining being effective even in the presence of lubricant.

12. The valve according to claim 11, wherein said friction surfaces have radial grooves formed therein for positively displacing lubricant away from said friction surfaces.

13. The valve according to claim 1, wherein said axially displaceable threaded part has a central axis and a thread with a lateral surface radius, and said friction surfaces are disposed at a mean distance from the central axis being at least twice the lateral surface radius.

14. The valve according to claim 1, including a plurality of spring groups producing a higher spring rigidity for resilient support of said rotatable threaded part in said housing if a predetermined command force is exceeded than if the command force fails to be attained.

15. The valve according to claim 14, wherein said plurality of spring groups include a first spring group for the command force, and a second spring group for an additional braking or total force.

16. The valve according to claim 15, wherein each of said spring groups have at least one cup spring.

17. The valve according to claim 16, wherein said cup springs of said spring groups are structurally identical.

18. The valve according to claim 15, wherein said second spring group is a brake ring being constructed as a spring element.

19. The valve according to claim 1, wherein said axially displaceable threaded part is a spindle being rotationally fixed in said housing.

20. The valve according to claim 1, wherein said axially displaceable threaded part is a nut being rotationally fixed in said housing.

21. A valve, comprising:
a housing;
a rotationally fixed threaded part being rotationally fixed and axially displaceable in said housing;
a rotatable threaded part being axially resiliently and rotatably supported in said housing;
a brake device including a brake sleeve being axially displaceable in said housing and having an end surface, and at least two friction surfaces facing one another, one of said friction surfaces being rotationally fixed to said housing and disposed on said end surface of said brake sleeve, and the other of said friction surfaces being rotationally fixedly joined to said rotatable threaded part;
said friction surfaces being pressed against one another by an axial displacement for braking a rotary motion of said rotatable threaded part and forming a braking surface, if a predetermined command force upon the rotationally fixed threaded part is exceeded; and
at least one of said friction surfaces having a predetermined free angle defined by end positions for rotational fixation, whereby after the free angle has been traversed, the friction surfaces are lifted from one another so that no braking torque exists until another of the end positions has been reached.

22. The valve according to claim 21, including a low-friction bearing for transmitting force to said friction surfaces.

23. The valve according to claim 21, wherein said friction surfaces being rotationally fixedly joined to said rotatable threaded part have the free angle.

24. The valve according to claim 21, wherein the free angle corresponds to a stroke of said rotatable threaded part of at least 0.01 mm.

25. The valve according to claim 21, wherein a plurality of said friction surfaces are displaceable counter to one another for forming a plurality of brake surfaces when the command force is exceeded.

26. The valve according to claim 25, including at least one brake ring having an inner surface with at least one recess formed therein, said rotatable threaded part having a driving tooth disposed thereon for entering said at least one recess.

27. The valve according to claim 26, wherein said at least one recess is at least three recesses.

28. The valve according to claim 27, wherein said driving tooth and said at least one brake ring at said recesses, have oblique lateral surfaces.

29. The valve according to claim 27, wherein said rotatable threaded part and said brake ring have a radial play of at least 0.02 mm therebetween.

30. The valve according to claim 21, wherein said friction surfaces are conical.

31. The valve according to claim 21, wherein said friction surfaces have a friction lining being effective even in the presence of lubricant.

32. The valve according to claim 21, wherein said friction surfaces have radial grooves formed therein for positively displacing lubricant away from said friction surfaces.

33. The valve according to claim 21, wherein said axially displaceable threaded part has a central axis and a thread with a lateral surface radius, and said friction surfaces are disposed at a mean distance from the central axis being at least twice the lateral surface radius.

34. The valve according to claim 21, including a plurality of spring groups producing a higher spring rigidity for resilient support of said rotatable threaded part in said housing if a predetermined command force is exceeded than if the command force fails to be attained.

35. The valve according to claim 34, wherein said plurality of spring groups include a first spring group for the command force, and a second spring group for an additional braking or total force.

36. The valve according to claim 35, wherein each of said spring groups have at least one cup spring.

37. The valve according to claim 36, wherein said cup springs of said spring groups are structurally identical.

38. The valve according to claim 35, wherein said second spring group is a brake ring being constructed as a spring element.

39. The valve according to claim 21, wherein said axially displaceable threaded part is a spindle being rotationally fixed in said housing.

40. The valve according to claim 21, wherein said axially displaceable threaded part is a nut being rotationally fixed in said housing.

* * * * *